(12) United States Patent
Bläse et al.

(10) Patent No.: US 6,558,545 B1
(45) Date of Patent: May 6, 2003

(54) SYSTEM FOR CROSS-FLOW PERMEATION BY MEANS OF A MEMBRANE

(75) Inventors: Dieter Bläse, Mutlangen (DE); Hans Olapinski, Aichwald (DE); Hans-Peter Feuerpeil, Schwäbisch Gmünd (DE)

(73) Assignee: AA FlowSystems GmbH & Co. KG, Essingen (DE)

( * ) Notice: Subject to any disclaimer, the term of this patent is extended or adjusted under 35 U.S.C. 154(b) by 0 days.

(21) Appl. No.: 09/575,790

(22) Filed: May 22, 2000

(30) Foreign Application Priority Data

Apr. 19, 2000 (DE) .......................... 100 19 674

(51) Int. Cl.[7] ................. B01D 63/16; B01D 65/02
(52) U.S. Cl. ................. 210/321.69; 210/321.67; 210/321.68; 210/324; 210/329; 210/330; 210/332; 210/334; 210/412
(58) Field of Search ............... 210/321.67, 321.68, 210/321.69, 324, 329, 330, 332, 334, 412, 414, 415

(56) References Cited

U.S. PATENT DOCUMENTS 3,997,447 A * 12/1976 Breton et al. ............... 210/366
4,897,192 A * 1/1990 Lawrence .................... 210/330
4,936,986 A * 6/1990 Tarves, Jr. ............... 210/321.64
5,073,262 A * 12/1991 Ahlberg et al. ......... 210/321.68
5,679,249 A * 10/1997 Fendya et al. .......... 210/321.63

FOREIGN PATENT DOCUMENTS

| DE | 195 02 848 | | 6/1995 |
| JP | 62-97604 | * | 5/1987 |
| JP | 7-289861 | * | 11/1995 |

* cited by examiner

Primary Examiner—John Kim
(74) Attorney, Agent, or Firm—Ohlandt, Greeley, Ruggiero & Perle, LLP

(57) ABSTRACT

The invention encompasses a system for the cross flow filtration of fluid media using membranes. The system has in a first embodiment two shafts, only one of which is hollow, with each shaft running through an axis of its given disc. The disc of each shaft is positioned offset with respect to one another to have a region of overlap therebetween. The region of overlap serves to enhance the efficient operation of the system by reducing the degree of settling of retentate on the disc of the hollow shaft, because of the wiping or cleaning effect achieved upon rotation of each shaft by a drive system. In another embodiment, both shafts are hollow.

17 Claims, 3 Drawing Sheets

SYSTEM FOR CROSS-FLOW PERMEATION BY MEANS OF A MEMBRANE

The invention encompasses a system for the filtration of media by means of a membrane structure consisting of, for example, membrane channels or membrane discs. Such systems are utilized in the most diverse sectors of industry, for example in the food industry or the paper industry.

In the case of disc-shaped membrane structures, the medium to be filtered is introduced on one side of the circumference of the disc, and the retentate is withdrawn from the opposite side. The permeate is removed after passage through the membrane.

A crucial requirement of a membrane system is its highly precise separation. The undesirable components should be separated as completely as possible from the desired components. A further requirement is a high permeate delivery in quantity per unit time for a given space requirement. Furthermore the energy consumption plays an important role.

The permeate delivery, or output of membrane systems, drops off after a certain period of operation, as a result of the deposition of solids on the membrane. In order to prevent or reduce this effect, countermeasures have been implemented. So, for example, it has been attempted to keep the membrane surface free of deposits by installing an impeller above the membrane surface, so as to keep the medium above the membrane in a state of turbulence. Similarly, scrapers have been employed to scrape deposits off the membrane surface.

These measures are, however, not entirely satisfactory.

The invention has the objectives of providing a system of the type described above, structured in such a Fray that the separation precision is maintained over a longer period of time, furthermore, a durable, high throughput can be achieved, the space requirement can be kept at a minimum, and the energy consumption is reduced in comparison to known systems.

These objectives are achieved by the features of the present invention.

According to the invention, the membrane discs of one membrane pack protrude into the spaces between consecutive discs of the second membrane pack (Dummy Pack). Viewed from above, this results in a degree of coverage or overlapping of the discs of one pack by the discs of the other pack. If the discs rotate, the radially external area of one disc will overlap the radially internal area of the other disc, so that the relative speed between two adjacent plates is made up of a high and a low speed. The relative speed between two plates is, therefore, essentially constant in the radial direction. This has a positive effect on the throughput, and consequently the energy consumption.

The invention comprises two main embodiments.

The first embodiment is to use a primary membrane pack which comprises a hollow shaft, and a secondary pack with a shaft that need not be hollow, and with discs that have a sealed outer surface.

A drive system serves to rotate the shafts of each of the packs. The packs can be rotated in a same direction as one another, in opposite directions from one another, and they can be oscillated. During rotation, the discs of the secondary pack run across the membrane discs of the primary pack. By this action, they cause agitation of the medium in the system and prevent deposition of substances on the surfaces of the membrane discs.

The second embodiment utilizes hollow discs and a hollow shaft for the secondary pack. The inner spaces of the hollow discs are connected to the space in the hollow shaft.

In one execution of the stated second embodiment the medium to be treated can be fed into the inside of the hollow plates of the secondary pack via the hollow shaft The discs of the secondary pack are equipped with openings or nozzles, which are directed against the surface of the membrane discs of the primary pack. So that the medium impacts on the membrane discs with a certain over-pressure and a certain flow velocity, which improves the performance of the entire system.

In any case, the discs of the secondary pack can have raised sections or elevations on their outer surfaces, so as to cause agitation of the medium contained in the apparatus, thereby reducing the danger of materials setting out on the membrane discs.

The invention can be further explained by means of the illustrations. The second embodiment is represented. In particular one can recognize Fe following:

Figure 1:
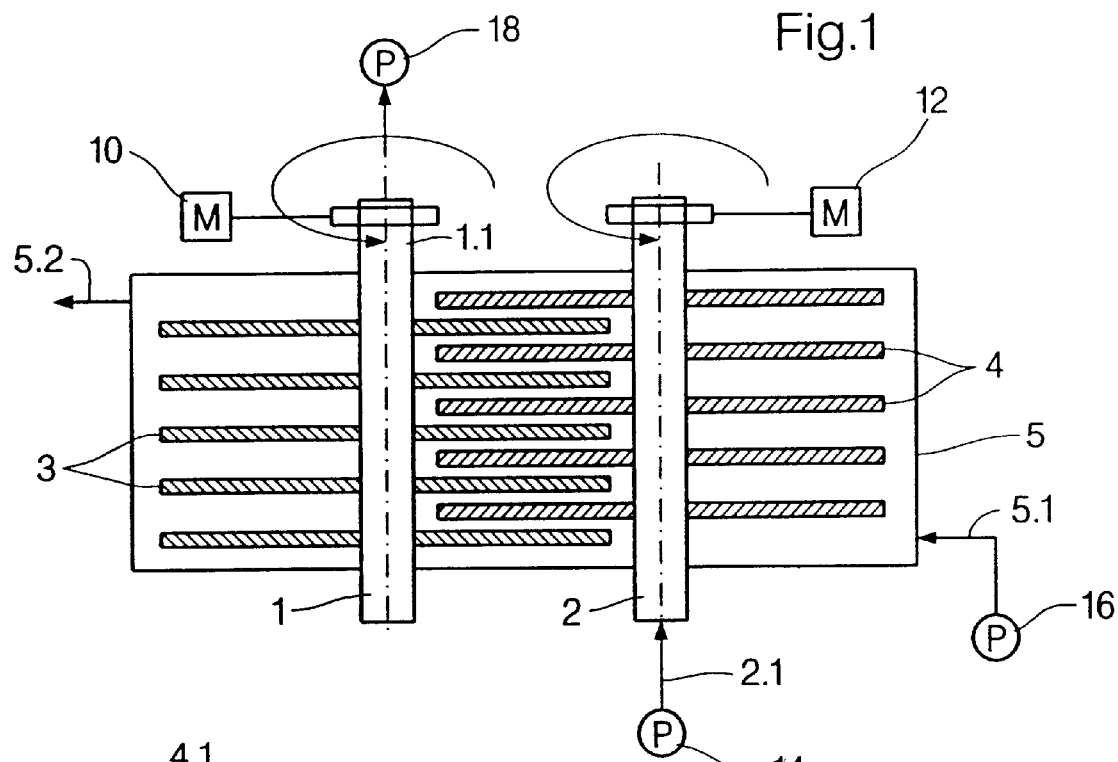
FIG. 1 shows the system in a schematic elevation.
Figure 1A:
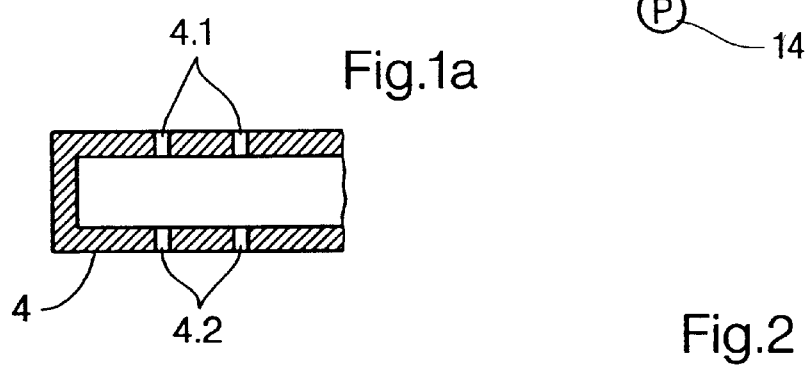
FIG. 1a shows an enlarged sectional view of item 4 in FIG. 1.

As shown in FIG. 1, the system has two hollow shafts (1, 2). Attached to each of the two hollow shafts is a disc pack (3, 4). The discs are arranged parallel to each other. Discs 3 rotate with the hollow shaft 1, and discs 4 rotate with the hollow shaft 2. A drive system M (10, 12) rotates each shaft. A positive pressure source P (14, 16), e.g., pump, is capable of providing positive pressure to permeate connection 1.1. A negative pressure source P (18), e.g., suction, is capable of providing negative pressure to permeate connection 1.1.

Figure 4:
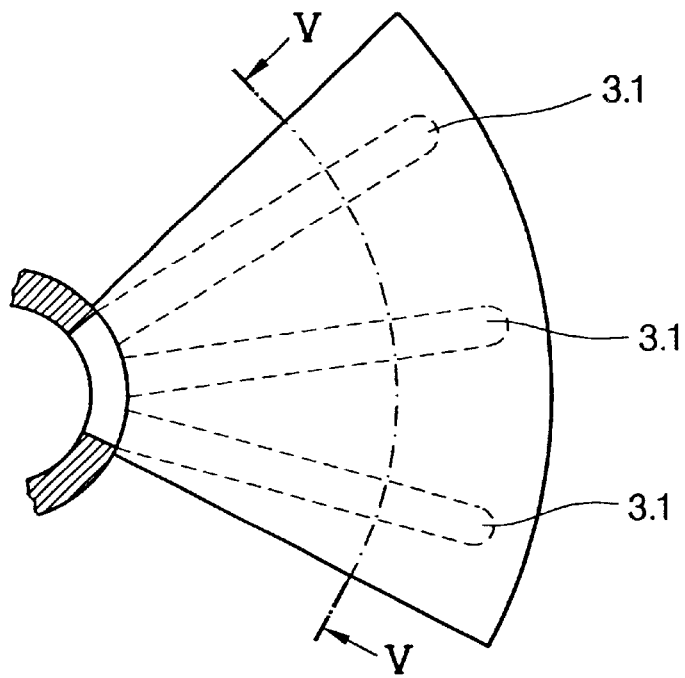
FIG. 4 shows a top view of a segment of a membrane disc.
Figure 5:
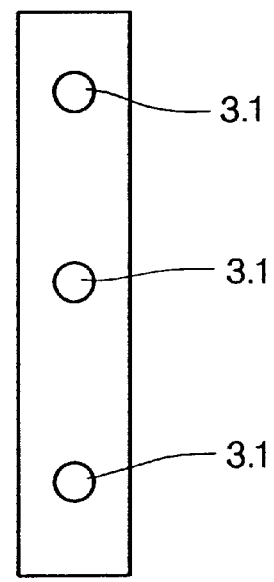
FIG. 5 shows a sectional elevation along the cutting line V—V of FIG. 4, in one possible configuration.

Discs 3 are made from a ceramic material. As shown in FIGS. 4 and 5, they are equipped with channels. As FIGS. 4 and 5 refer to a segment of disc 3, one can see the channels 3.1, which are arranged radially. It is important that the cross-sectional area of a given channel is less than the cross-sectional area of the ceramic material of which the disc is made. In a preferred embodiment, a ratio of the areas of the channel and the material defining the disc is 0.5 or less. Furthermore, it is apparent that the channels run from the perimeter of the segment to hollow shaft 1 and form a continuous connection to its interior. Alternatively, certain deviations from the radial direction are possible.

The hollow shaft and the discs attached to it are referred to as a "pack".

While the discs 3 are membrane discs, discs 4 can be made from a different material. They are also hollow. Their Interior spaces are continuously connected to the interior of the hollow shaft 2.

In addition, discs 4 are equipped with nozzlelike openings (4.1, 4.2) on their surfaces, which are directed against the membrane discs 3.

The pack consisting of hollow shaft 1 and discs 3 is similarly designed and constructed as the pack consisting of hollow shaft 2 and discs 4. Derivatives of this design are, however, possible The discs of one pack can, for example, have a greater diameter than the discs of the other pack. In the illustrated case the discs are circular. Alternative shapes are also possible. For example, an oval shape could be considered.

Both packs are arranged in a container 5. The container has an inlet 5.1 and an outlet 6.2. The two hollow shafts 1 and 2 have outlets/inlets 1.1 and 2.1 respectively.

The system operates as follows:

The medium to be treated is fed to container 5 via inlet 5.1. Furthermore, medium is also fed via inlet 2.1 in the hollow shaft 2. From hollow shaft 2 the medium reaches the interior of the hollow discs 4 and, from there is directed via the openings 4.1, 4.2 at the membrane disc 3, onto which it impacts.

As can be seen from FIGS. 4 to 8, channels 3.1 perforate the membrane discs. The permeate, which has been separated by the ceramic membrane from the feed medium, flows along channels 3.1 to the hollow shaft 1. It then leaves the system via outlet 1.1.

The retentate, on the other hand, is removed from container 5 via outlet port for the retentate 5.2. In addition, the system of the present invention has a circulating arrangement that connects port 5.2 and redirects exited retentate back into the enclosure in either or both of two ways: 1) via the inlet port for the enclosure 5.1 and 2) via the inlet 2.1 for the hollow shaft 2.

Figure 2:
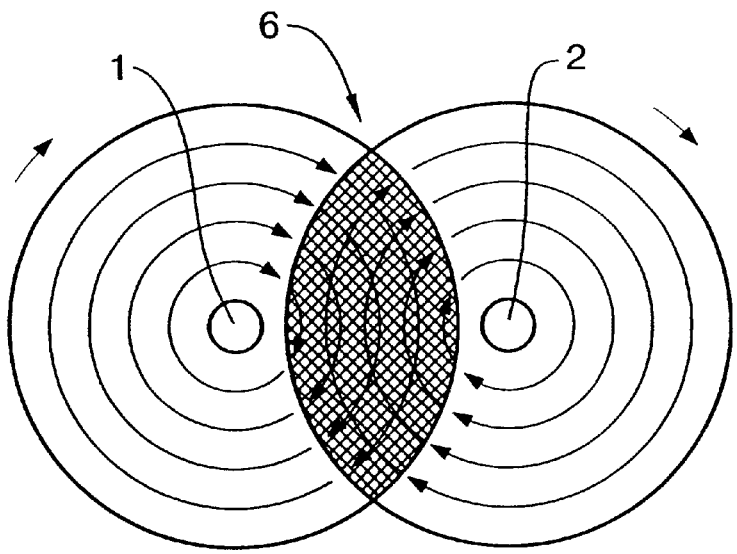
FIG. 2 shows a top view of the system in FIG. 1.

As illustrated in FIG. 2, the membrane discs 3 overlap the discs 4 of the other pack. In the area of overlap 6 the medium becomes turbulent This has a cleaning effect on the surface of the membrane discs. The specific permeation rate increases, which means that the energy consumption per unit quantity becomes especially low.

Figure 3:
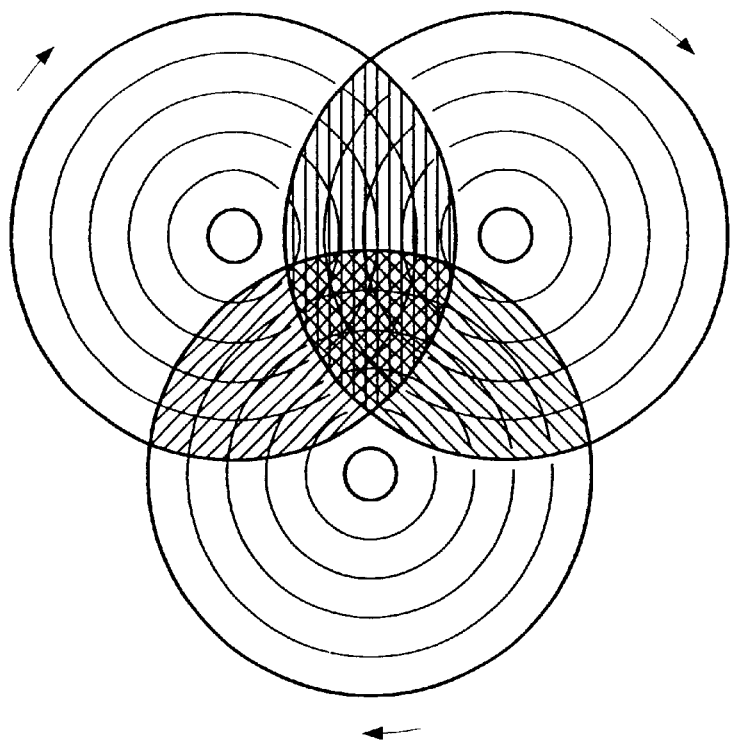
FIG. 3 shows an alternative configuration of the system in FIG. 1, again in top view.

The configuration shown in FIG. 3 is based on three packs. These are also arranged in an enclosure—not shown.

A further possibility is that even larger numbers of packs are arranged in the same basic system. It is, therefore, possible to place one pack centrally, while the other packs are arranged concentrically around the central pack.

From FIGS. 4 and 5, one can deduce that the individual membrane disc 3 and 4 can be constructed from a multitude or segments. The, here illustrated, arc segment is, therefore, a portion of the membrane disc 3. The membrane discs can, however, also be constructed as a single part.

Figure 6:
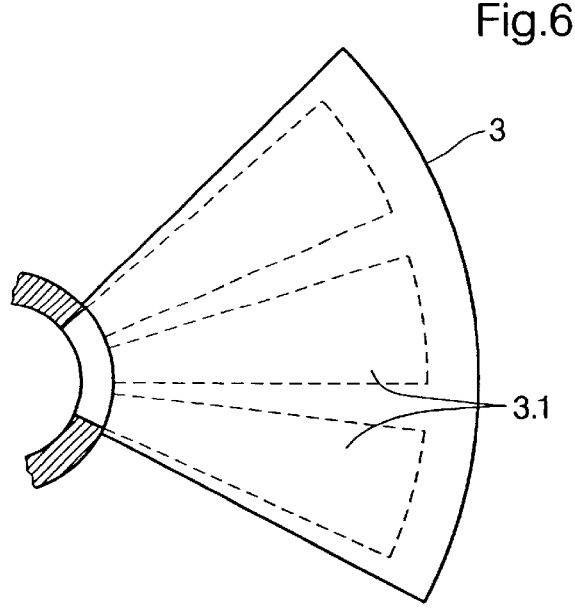
FIGS. 6 and 7 show further possible configurations of segments of a membrane disc, again as seen in top view.
Figure 7:
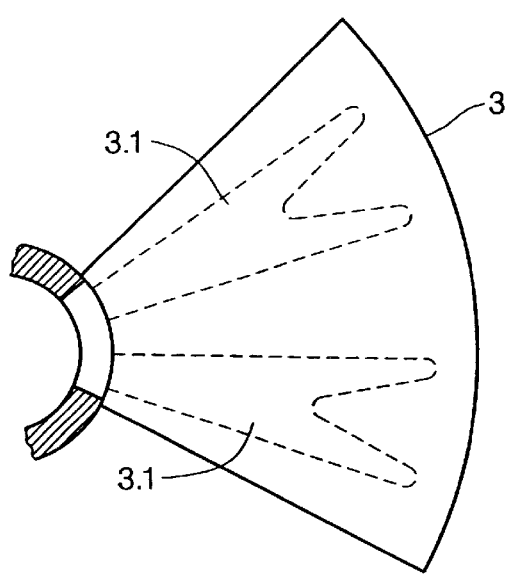

The membrane discs illustrated in FIGS. 6 and 7 show permeate channels 3.1 in a particular configuration. As one can see in this top view, the channels constrict from the outside to the inside. They are, therefore, wedge shaped.

In the configuration shown in FIG. 7, the channels 3.1 are also wedge shaped, but have an indentation in the outer radial area. The channel, as seen from above, has the shape of a forked branch.

The purpose of this channel design is to achieve the shorts possible distance from the membrane surface to the permeate removal channel.

Figure 8:
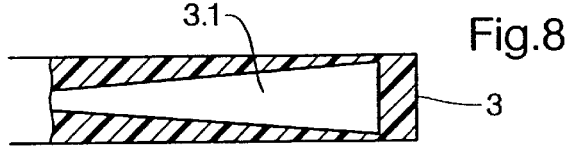
FIG. 8 illustrates an axial cut side view of a membrane disc with one possible channel configuration.

A different effect is achieved by the channel design shown in FIG. 8—this time in axial sectional view through the disc pack. As one can see, the channel again constricts from the outside to the inside. In a rotating disc the permeate in the outer area of the disc is under slightly increased pressure. The illustrated design of the channel compensates for this pressure increase.

Figure 9:
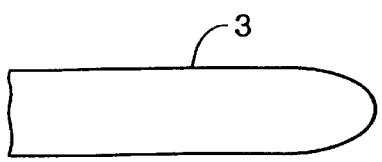
FIG. 9 shows a side view of a membrane disc.

From FIG. 9 one can see that the outer edge of the membrane disc 3 has a streamlined design, similar to the leading edge of a wing. It has been shown that this substantially reduces abrasion.

What is claimed is:

1. A system for cross-flow filtration of fluid media, comprising:

an enclosure having an inlet port for untreated media and an outlet port for retentate;

a first disc in said enclosure, wherein said first disc is a membrane having a first radial interior channel to a first hollow shaft that runs through an axis of said first disc, and wherein said first hollow shaft has an end that protrudes through said enclosure and provides an outlet port for permeate that flows through said first disc;

a second disc in said enclosure, having a second radial interior channel to a second hollow shaft that runs through an axis of said second disc, wherein said first disc and said second disc are positioned offset to one another to have a region of overlap therebetween;

wherein said second hollow shaft has an end that protrudes through said enclosure and provides an inlet for a medium that is discharged through openings in said second disc into said region of overlap; and wherein said discharge agitates said fluid media in said region of overlap to minimize settling of said retentate on said first disc.

2. The system of claim 1, further comprising a drive system for rotation of said first disc and said second disc, wherein said drive system imparts an oscillating motion to said first disc and said second disc.

3. The system of claim 1, further comprising a drive system for rotation of said first disc and said second disc, wherein said drive system rotates said first disc and said second disc in a same direction.

4. The system of claim 1, further comprising a drive system for rotation of said first disc and said second disc, wherein said drive system rotates said first disc and said second disc in an opposite direction.

5. The system of claim 1, wherein said outlet port for permeate is under negative pressure by a negative pressure source.

6. The system of claim 1, wherein said outlet port for permeate is under positive pressure by a, positive pressure source.

7. The system of claim 1, wherein said radial interior channel and said membrane surrounding said channel each have a cross sectional area, and wherein the cross sectional area of said first radial interior channel is substantially smaller than the cross sectional area of said membrane surrounding said channel.

8. The system of claim 1, wherein said radial interior channel and said membrane surrounding said channel each have a cross sectional area, and wherein the cross sectional areas of said first radial interior channel to said membrane surrounding said channel of which said first disc is composed have a ratio of 0.5 or less.

9. The system of claim 1, further comprising a circulating loop arrangement directs exited retentate back into said enclosure through said inlet port.

10. The system of claim 1, wherein said fluid media in said enclosure is under pressure.

11. The system of claim 1, wherein said first disc is made of material selected from the group consisting of ceramic, metal and plastic.

12. The system of claim 1, wherein said first disc is one of a first plurality of discs, wherein said first hollow shaft runs through the axis of said first plurality of discs, and wherein said first plurality of discs are spaced at substantially regular distance from each other.

13. The system of claim 12, wherein said second disc is one of a second plurality of discs, and wherein said second plurality of discs interleaves said first plurality of discs.

14. The system of claim 1, wherein said first disc has an outer edge that approaches the shape of a leading edge of a wing when viewed laterally.

15. The system of claim 1, further comprising a circulating loop arrangement that directs exited retentate back into said enclosure through said second hollow shaft.

16. The system of claim 1, further comprising a circulating loop arrangement that directs exited retentate back into said enclosure through said inlet port for untreated media.

17. A system for cross-flow filtration of fluid media, comprising:

an enclosure having an inlet port for untreated media and an outlet port for retentate;

a first disc in said enclosure, wherein said first disc is a membrane having a radial interior channel to a hollow shaft that runs through an axis of said first disc, wherein said radial interior channel reduces in area radially from a perimeter of said first disc toward said hollow shaft, and wherein said hollow shaft has an end that protrudes through said enclosure and provides an outlet port for permeate that flows through said first disc;

a second disc in said enclosure, having a second shaft that runs through an axis of said second disc, wherein said first disc and said second disc are positioned offset to one another to have a region of overlap therebetween; and wherein said fluid media is agitated in said region of overlap to minimize settling of said retentate on said first disc.

* * * * *

UNITED STATES PATENT AND TRADEMARK OFFICE
CERTIFICATE OF CORRECTION

PATENT NO. : 6,558,545 B1
DATED : May 6, 2003
INVENTOR(S) : Dieter Bläse, Hans Olapinski and Hans-Peter Feuerpeil It is certified that error appears in the above-identified patent and that said Letters Patent is hereby corrected as shown below:

Column 4,
Line 38, delete ","

Signed and Sealed this

Thirteenth Day of July, 2004

JON W. DUDAS
*Acting Director of the United States Patent and Trademark Office*